United States Patent
Fusiki et al.

(10) Patent No.: US 7,410,030 B2
(45) Date of Patent: Aug. 12, 2008

(54) SOUNDPROOFING MATERIAL FOR VEHICLE

(75) Inventors: Sinobu Fusiki, Kasugai (JP); Syuiti Mizata, Kasugai (JP)

(73) Assignee: Howa Textile Industry Co., Ltd., Kasugai (JP)

( * ) Notice: Subject to any disclaimer, the term of this patent is extended or adjusted under 35 U.S.C. 154(b) by 158 days.

(21) Appl. No.: 11/357,786

(22) Filed: Feb. 17, 2006

(65) Prior Publication Data

US 2007/0012512 A1 Jan. 18, 2007

(30) Foreign Application Priority Data

Jul. 13, 2005 (JP) .............................. 2005-204073

(51) Int. Cl.
*G10K 11/16* (2006.01)
(52) U.S. Cl. ..................... 181/286; 181/290; 181/296
(58) Field of Classification Search ................. 181/286, 181/290, 296
See application file for complete search history.

(56) References Cited

U.S. PATENT DOCUMENTS

| | | | | |
|---|---|---|---|---|
| 3,480,104 | A * | 11/1969 | Austin et al. ................. | 181/286 |
| 4,190,131 | A * | 2/1980 | Robinson ..................... | 181/296 |
| 4,992,320 | A * | 2/1991 | Gower ......................... | 428/184 |
| 5,258,585 | A * | 11/1993 | Juriga .......................... | 181/286 |
| 5,459,291 | A * | 10/1995 | Haines et al. ................ | 181/286 |
| 5,493,081 | A * | 2/1996 | Manigold .................... | 181/286 |
| 5,536,556 | A * | 7/1996 | Juriga .......................... | 428/138 |
| 5,584,950 | A * | 12/1996 | Gaffigan ....................... | 156/71 |
| 5,800,888 | A * | 9/1998 | Yasumoto et al. ......... | 428/36.91 |
| 5,965,851 | A * | 10/1999 | Herreman et al. ........... | 181/200 |
| 6,077,613 | A * | 6/2000 | Gaffigan ...................... | 428/442 |
| 6,123,171 | A * | 9/2000 | McNett et al. .............. | 181/290 |
| 6,152,259 | A * | 11/2000 | Freist et al. ................. | 181/290 |
| 6,177,180 | B1* | 1/2001 | Bodine et al. ............... | 428/223 |
| 6,631,785 | B2* | 10/2003 | Khambete et al. .......... | 181/290 |
| 7,121,380 | B2* | 10/2006 | Garnier et al. .............. | 181/286 |
| 2005/0126848 | A1* | 6/2005 | Siavoshai et al. ........... | 181/207 |
| 2006/0191743 | A1* | 8/2006 | Pike et al. ................... | 181/290 |
| 2006/0289231 | A1* | 12/2006 | Priebe et al. ................ | 181/290 |
| 2007/0012512 | A1* | 1/2007 | Fusiki et al. ................ | 181/286 |

FOREIGN PATENT DOCUMENTS

| | | |
|---|---|---|
| JP | 2001-347900 | 12/2001 |
| JP | 3264230 | 12/2001 |
| JP | 3498085 | 11/2003 |

* cited by examiner

*Primary Examiner*—Lincoln Donovan
*Assistant Examiner*—Forrest Phillips
(74) *Attorney, Agent, or Firm*—Ohlandt, Greeley, Ruggiero & Perle, L.L.P.

(57) ABSTRACT

A soundproofing material for vehicle having a laminated structure comprising two sound absorbing layers and an interlayer interposed therebetween, characterized in that the interlayer is formed by bonding and laminating on the respective side of an air-impermeable film made of a thermoplastic resin film having a thickness of from $7\mu$ to $50\mu$ heat-fusible films having a thickness of from $7\mu$ to $50\mu$ made of a thermoplastic resin film having a lower melting point than that of the air-impermeable film using a multi-layer inflation method and the soundproofing material is heat pressure-molded so that the heat-fusible film is melted to cause the sound absorbing layers to be bonded to the respective side of the air-impermeable film.

4 Claims, 7 Drawing Sheets

[Fig. 1]
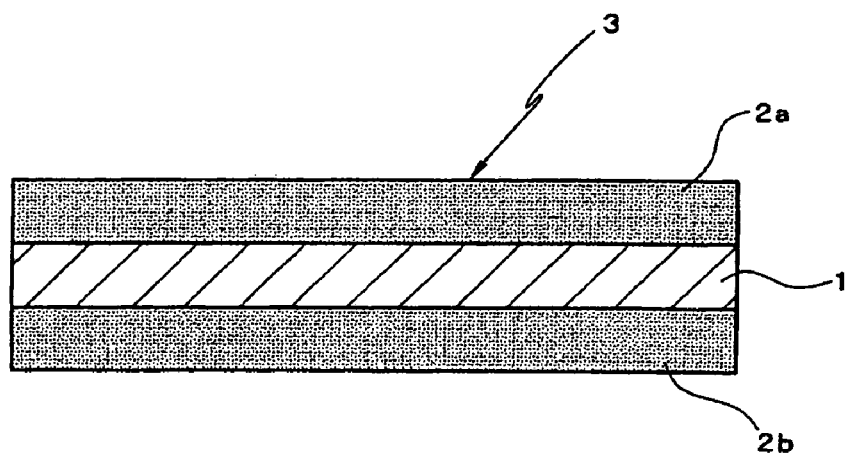

[Fig. 2]
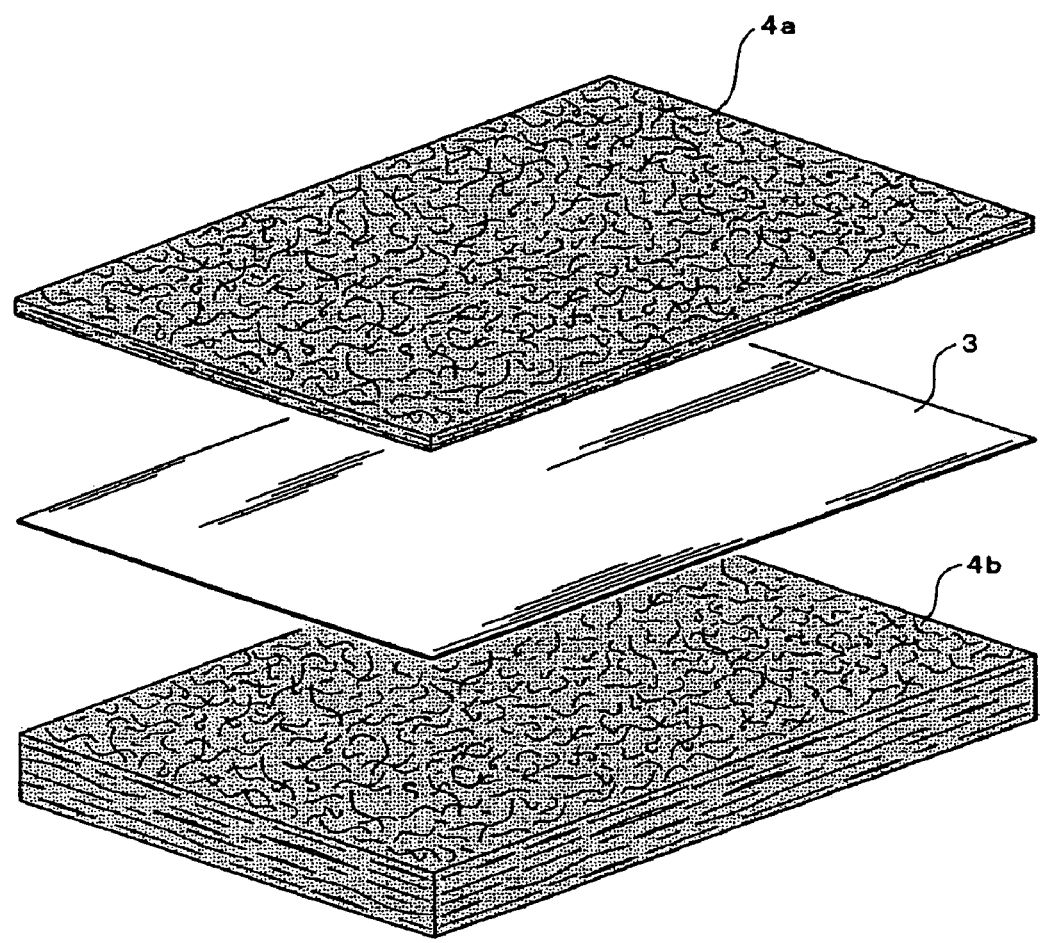

[Fig. 3]
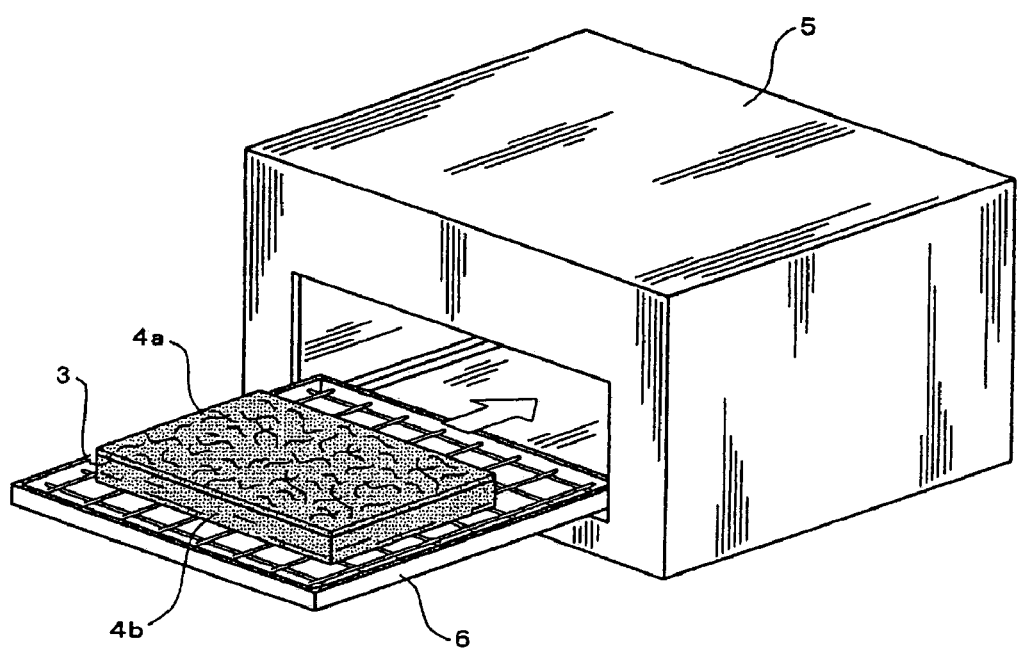

[Fig. 4]
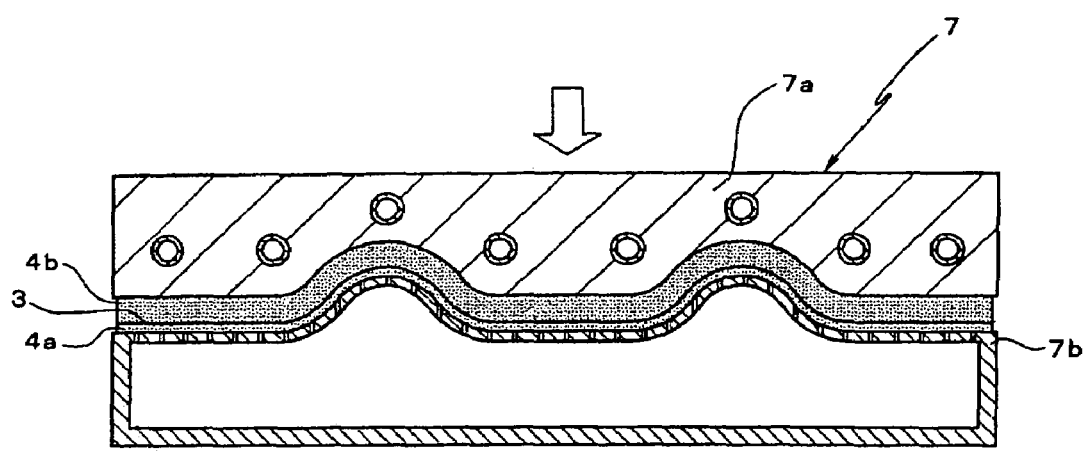

[Fig. 5]
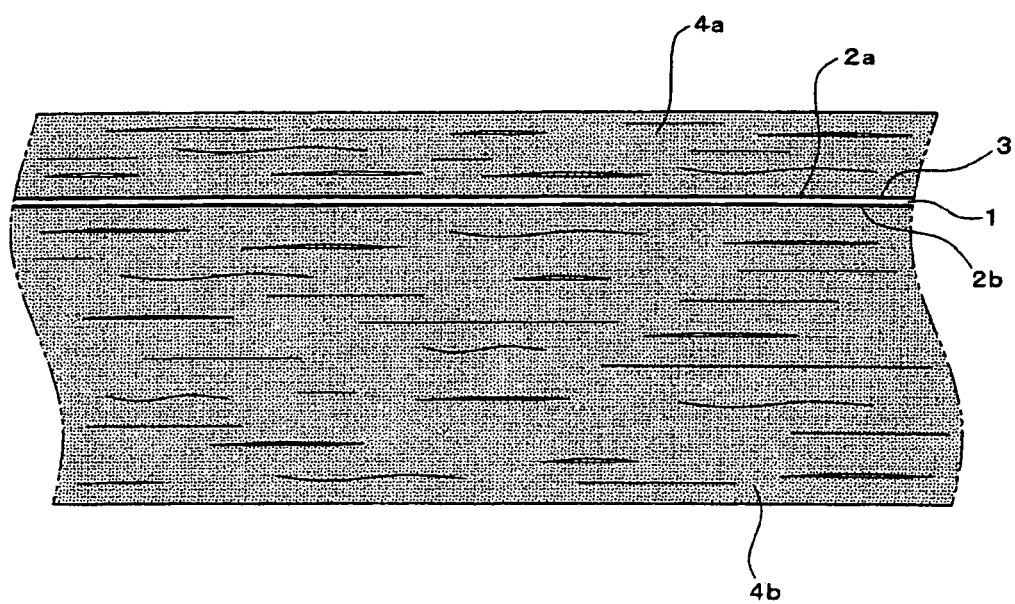

[Fig. 6]
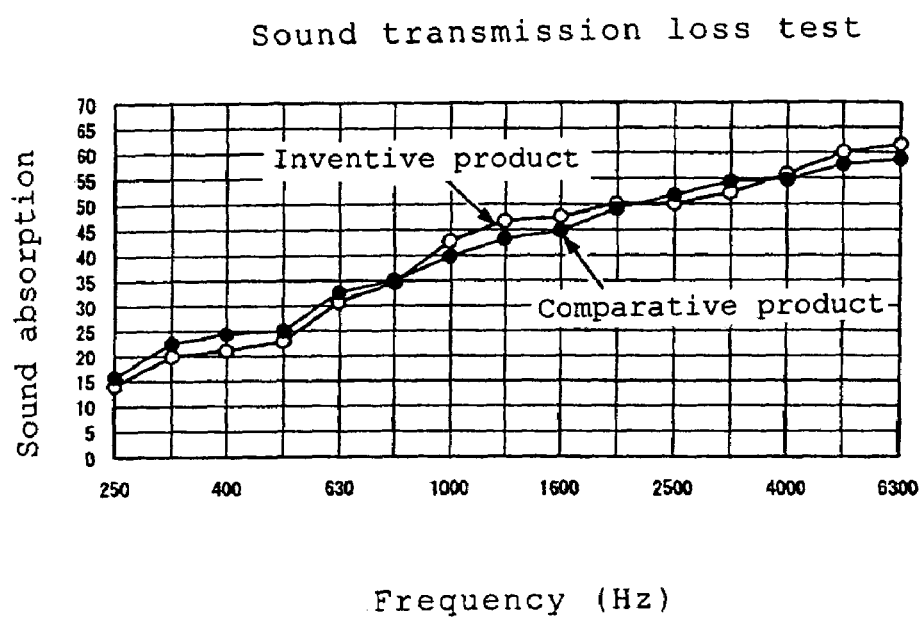

[Fig. 7]
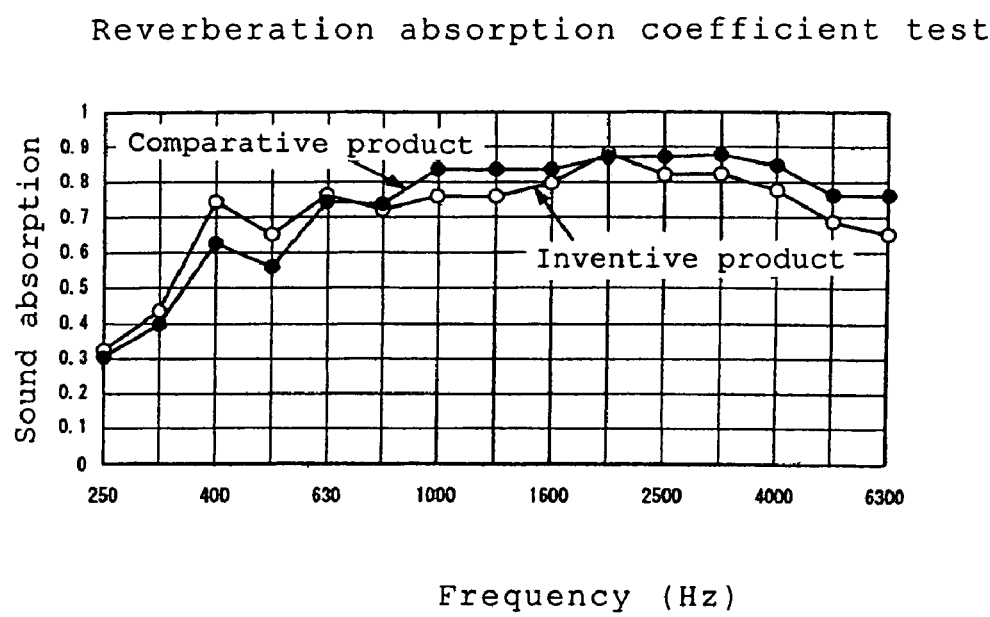

SOUNDPROOFING MATERIAL FOR VEHICLE

FIELD OF THE INVENTION

The present invention relates to a soundproofing material for vehicle having a light weight and a small thickness and being excellent in sound barrier properties and sound absorbing properties which is used as a floor surfacing material for automobile cabinet.

DISCUSSION OF THE BACKGROUND ART

With the recent demand for soundproofing material for vehicle having a lighter weight, felt-based light weight soundproofing materials have been mainly used in place of related art heavy sheets made of EPDM, olefin or the like. Felt has excellent sound absorbing properties but has poor sound barrier properties. In order to eliminate this shortcoming, it has heretofore been practiced to compress felt so that it becomes less air-permeable.

On the other hand, Japanese Patent No. 3498085 cited below discloses a soundproofing material having an ultralight weight obtained by bonding a sound absorbing layer such as felt and a resonance layer such as film to each other with an adhesive at a predetermined adhesion. However, this soundproofing material is disadvantageous in that it has a two-layer structure and thus can difficultly absorb noise in the cabinet. Further, this soundproofing material is also disadvantageous in that its rigidity is too small for dash silencer to attain required shape stability.

Further, Japanese Patent Publication No. Patent No. 2001-347900 and Japanese Patent No. 3264230 each disclose a three-layer soundproofing material comprising a sound absorbing layer such as felt provided on the both sides of an air-impermeable film. However, since this kind of a multi-layer soundproofing material is obtained by bonding a film and a sound absorbing layer to each other with either of these layers impregnated or coated with an adhesive, it is disadvantageous in that the production method involves additional steps that add to the cost and the resulting soundproofing material can be difficultly formed into a free three-dimensional shape following the shape of the vehicle body.

It is therefore an object of the present invention to provide a soundproofing material for vehicle having a light weight, a small thickness and excellent soundproofing properties which can be easily formed into a free three-dimensional shape and can be produced at reduced cost.

SUMMARY OF THE INVENTION

A soundproofing material for vehicle having a laminated structure comprising two sound absorbing layers and an interlayer interposed therebetween, characterized in that the interlayer is formed by bonding and laminating on the both sides of an air-impermeable film made of a thermoplastic resin film having a thickness of from 7µ to 50µ a heat-fusible film having a thickness of from 7µ to 50µ made of a thermoplastic resin film having a lower melting point than that of the air-impermeable film using a multi-layer inflation method and the soundproofing material is heat pressure-molded so that the heat-fusible film is melted to cause the sound absorbing layers to be bonded to the respective side of the air-impermeable film.

The aforementioned soundproofing material for vehicle, wherein the air-impermeable film is made of a thermoplastic resin film having a higher melting point than that of the heat-fusible film such as nylon and polyester.

The aforementioned soundproofing material for vehicle, wherein the heat-fusible film is made of a thermoplastic resin film having a lower melting point than that of the air-impermeable film such as polyethylene and polypropylene.

The aforementioned soundproofing material for vehicle, wherein the sound absorbing layer is made of a fiber assembly such as felt and glass wool or a porous synthetic resin layer such as urethane foam.

The aforementioned soundproofing material for vehicle, wherein one of the sound absorbing layers has a thickness of from 0.5 mm to 15 mm and a weight of from 100 to 2,000 g/m$^2$ and the other has a thickness of from 5 mm to 40 mm and a weight of from 500 to 3,000 g/m$^2$.

In accordance with the present invention, as an interlayer there is used an air-impermeable film having a heat-fusible film bonded and laminated on the both sides thereof by a multi-layer inflation method. When the interlayer is heat-pressed to form a desired three-dimensional shape, the heat-fusible film is melted to cause the sound absorbing layer to be bonded to the air-impermeable film. This reduces the steps required for production and hence the production cost. Further, the soundproofing material for vehicle thus produced has a light weight and a small thickness and exhibits excellent sound absorbing properties and sound barrier properties that can keep the interior of the vehicle silent.

BRIEF DESCRIPTION OF THE DRAWINGS

FIG. 1 is a longitudinal sectional view of the interlayer in a soundproofing material for vehicle according to the present invention;

FIG. 2 is an exploded perspective view of a soundproofing material for vehicle according to the present invention;

FIG. 3 is a perspective view of an oven for producing a soundproofing material for vehicle according to the present invention;

FIG. 4 is a longitudinal sectional view of a cold-forming mold for producing a soundproofing material for vehicle according to the present invention;

FIG. 5 is a longitudinal sectional view of a soundproofing material for vehicle according to the present invention;

FIG. 6 is a graph depicting the sound barrier properties of a soundproofing material for vehicle according to the present invention; and FIG. 7 is a graph depicting the sound absorbing properties of a soundproofing material for vehicle according to the present invention.

DETAILED DESCRIPTION OF THE PREFERRED EMBODIMENT

As well known, the inflation method comprises extruding a molten resin upward vertically from an inflation mold provided in an extruder while blowing air from the central part of the mold so that the molten resin is expanded to a thin wall cylinder to form a film of continuous length. In the present embodiment, as shown in FIG. 1, heat-fusible films 2a and 2b having a thickness of from 7µ to 50µ made of a thermoplastic resin film having a melting point of from 100° C. to 130° C. such as polyethylene and polypropylene are bonded and laminated on the respective side of an air-impermeable film 1 having a thickness of from 7µ to 50µ made of a thermoplastic resin film having a melting point of from 160° C. to 250° C. such as nylon and polyester. The resulting laminate is an interlayer 3.

On the other hand, as shown in FIG. 2, a sound absorbing layer 4a having a thickness of from 0.5 mm to 15 mm and a weight of from 100 to 2,000 g/m² made of a fiber assembly such as felt and glass wool or a porous synthetic resin such as urethane foam and a sound absorbing layer 4b having a thickness of from 5 mm to 40 mm and a weight of from 500 to 3,000 g/m² are disposed on the respective side of the aforementioned interlayer 3. As shown in FIG. 3, the laminate is put on a tray 6 which is then put in an oven 5. In the oven 5, hot air of about 200° C. is then blown against the both sides of the laminate for 30 to 60 seconds so that it is heated to melt the heat-fusible films 2a, 2b. The soundproofing material is then immediately moved into a cold-forming mold 7 as shown in FIG. 4 in which it is then pressed to form a desired three-dimensional shape. During this procedure, the sound absorbing layers 4a, 4b are bonded to the respective side of the air-impermeable film 1. The cold-forming mold 7 comprises an upper mold 7a having a cooling water pipe incorporated therein and a lower mold 7b having a number of suction holes formed on the molding surface thereof capable of vacuum-sucking the soundproofing material.

When the soundproofing material for vehicle thus produced is mounted on a vehicle body in such an arrangement that the sound absorbing layer 4a is disposed on the interior side while the sound absorbing layer 4b is disposed on the engine room side or exterior side as shown in FIG. 5, the engine room or exterior noise can be prevented and the noise leaked to the interior can be absorbed, keeping the interior silent.

In accordance with the present invention, when the soundproofing material for vehicle is heated and pressed to form a desired three-dimensional shape, the heat-fusible film is melted to cause the sound absorbing layer to be bonded to the air-impermeable film, making it possible to eliminate the conventional step of spreading an adhesive or other steps and hence drastically reduce the production cost. Further, since the soundproofing material for vehicle can be formed at the same time with the heat fusion of the air-impermeable film, the resulting soundproofing material exhibits enhanced rigidity and shape retention and thus can be formed into a complicated shape to advantage.

EXAMPLE 1

In the present example, as the aforementioned air-impermeable film 1 there is used a nylon film having a thickness of 15μ. As the heat-fusible films 2a, 2b to be bonded and laminated on the respective side of the air-impermeable film 1 by a multi-layer inflation method there are used polyethylene films having a thickness of 20μ. Further, as one sound absorbing layer 4a, a PET felt is laminated on one side of the interlayer to a thickness of 3 mm and a weight of 500 g/m². As the other sound absorbing layer 4b, a PET felt is laminated on the other side of the interlayer to a thickness of 20 mm and a weight of 1,000 g/m². The laminate is then heated in the oven 5 for 50 seconds as shown above, and then pressure-molded in the cold-forming mold 7.

The soundproofing material for vehicle thus obtained exhibited excellent results both in sound barrier properties and sound absorbing properties as can be seen in the results of sound transmission loss test shown in FIG. 6 and in the results of reverberation absorption coefficient test shown in FIG. 7, respectively. These figures each depicts the data of an inventive soundproofing material for vehicle represented by the circle and a comparative soundproofing material for vehicle represented by the solid circle. Unlike the inventive product, the comparative soundproofing material for vehicle was free of interlayer. The comparative soundproofing material for vehicle was prepared merely by laminating a PET felt layer having a thickness of 3 mm and a weight of 1,000 g/m² and a PET felt layer having a thickness of 20 mm and a weight of 1,000 g/m² on each other. This test made it possible to confirm that the inventive soundproofing material for vehicle can be reduced in weight as compared with the comparative soundproofing material and can exhibit the same or higher acoustic properties than the comparative product. Accordingly, the soundproofing material for vehicle according to the present invention can be used as a dash silencer at the border with engine room. Further, the soundproofing material for vehicle can be spread over the floor and roof of the interior of the cabinet to absorb noise and keep the interior of the cabinet more silent.

What is claimed is:

1. A soundproofing material for vehicle having a laminated structure comprising two sound absorbing layers and an interlayer interposed therebetween, wherein said interlayer is formed by bonding and laminating on both sides of an air-impermeable film having a thickness of from 7μ to 50μ made of a thermoplastic resin film having a melting point of from 160° C. to 250° C., a heat-fusible film having a thickness of from 7μ to 50μ made of a thermoplastic resin film having a melting point of from 100° C. to 130° C. using a multi-layer inflation method, a first one of the two sound absorbing layers has a thickness of from 0.5 mm to 15 mm and a weight of from 100 to 2,000 g/m², a second one of the two sound absorbing layers has a thickness of from 5 mm to 40 mm and a weight of from 500 to 3,000 g/m², wherein when the soundproofing material is put in an oven, wherein hot air of about 200° C. is blown against both sides of the interlayer for 30 to 60 seconds so that the heat-fusible films are melted to cause the sound absorbing layers to be bonded to a respective side of the air-impermeable film, wherein when the soundproofing material is immediately moved into a cold-forming mold comprising an upper mold having a cooling water pipe incorporated therein and a lower mold having a plurality of suction holes formed on a molding surface, wherein the interlayer is pressed to form a desired three-dimensional shape.

2. The soundproofing material for vehicle according to claim 1, wherein the sound absorbing layer is a fiber assembly made of felt.

3. The soundproofing material for vehicle according to claim 1, wherein the sound absorbing layer is a fiber assembly made of glass wool.

4. The soundproofing material for vehicle according to claim 1, wherein the sound absorbing layer is a porous synthetic resin layer made of urethane foam.

* * * * *